(12) United States Patent
Smith et al.

(10) Patent No.: US 10,904,138 B2
(45) Date of Patent: *Jan. 26, 2021

(54) ROUTE SELECTION SYSTEM FOR A COMMUNICATION NETWORK AND METHOD OF OPERATING THE SAME

(71) Applicant: Level 3 Communications, LLC, Broomfield, CO (US)

(72) Inventors: Darrell Smith, Denver, CO (US); Francis Ferguson, Aurora, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,273

(22) Filed: Aug. 16, 2019

(65) Prior Publication Data

US 2019/0372891 A1    Dec. 5, 2019

Related U.S. Application Data

(63) Continuation of application No. 15/595,450, filed on May 15, 2017, now Pat. No. 10,389,621.
(Continued)

(51) Int. Cl.
*H04L 12/707* (2013.01)
*H04L 1/20* (2006.01)
(Continued)

(52) U.S. Cl.
CPC ............ *H04L 45/22* (2013.01); *H04L 1/008* (2013.01); *H04L 1/205* (2013.01);
(Continued)

(58) Field of Classification Search
CPC ......... H04L 45/22; H04L 1/008; H04L 1/205; H04L 43/0876; H04L 45/04; H04L 45/12;
(Continued)

(56) References Cited

U.S. PATENT DOCUMENTS 6,829,221 B1    12/2004 Winckles
7,197,040 B2 *   3/2007 Bressoud ............... H04L 45/04
                                                   370/401
(Continued)

OTHER PUBLICATIONS

International Preliminary Report on Patentability, dated Nov. 27, 2018, Int'l Appl. No. PCT/US17/032699, Int'l Filing Date May 15, 2017; 9 pgs.
(Continued)

*Primary Examiner* — Patrice L Winder
*Assistant Examiner* — Aye M Aung

(57) ABSTRACT

A route selection system includes a hub controller in communication with multiple network hubs of a first network domain in which each of the hubs are in communication with a corresponding multiple routers of a second network domain. The hub controller is executed to obtain at least one performance measurement associated with a route terminating at the network hub, generate a border gateway protocol (BGP) advertisement with a preference value that is proportional to the received performance measurement, and transmit the generated advertisement to the network hub, the network hub forwarding the advertisement to the router configured in the other network domain. Upon receipt of the advertisements, the second network domain selects one of the routers for processing the route through the second network domain according to the performance measurement included in the advertisement.

18 Claims, 5 Drawing Sheets

Related U.S. Application Data

(60) Provisional application No. 62/340,955, filed on May 24, 2016.

(51) Int. Cl.
| | | |
|---|---|---|
| *H04L 12/715* | (2013.01) | |
| *H04L 12/725* | (2013.01) | |
| *H04L 1/00* | (2006.01) | |
| *H04L 12/26* | (2006.01) | |
| *H04L 12/721* | (2013.01) | |
| *H04W 72/04* | (2009.01) | |
| *H04L 12/723* | (2013.01) | |
| *H04L 12/803* | (2013.01) | |

(52) U.S. Cl.
CPC .......... *H04L 43/0876* (2013.01); *H04L 45/04* (2013.01); *H04L 45/12* (2013.01); *H04L 45/308* (2013.01); *H04W 72/0493* (2013.01); *H04L 43/08* (2013.01); *H04L 45/24* (2013.01); *H04L 45/50* (2013.01); *H04L 47/125* (2013.01)

(58) Field of Classification Search
CPC ....... H04L 45/308; H04L 43/08; H04L 45/24; H04L 45/50; H04L 47/125; H04W 72/0493
See application file for complete search history.

(56) References Cited

U.S. PATENT DOCUMENTS

| | | | |
|---|---|---|---|
| 7,969,907 B2 | 6/2011 | shah et al. | |
| 9,191,139 B1 | 11/2015 | Venkata | |
| 9,900,242 B2 * | 2/2018 | Xu | ........... H04L 45/14 |
| 10,069,904 B2 | 9/2018 | Sgh | |
| 10,320,670 B2 | 6/2019 | Nguyen | |
| 2002/0165957 A1 * | 11/2002 | Devoe | ..... H04L 43/50 709/224 |
| 2007/0070959 A1 * | 3/2007 | Almeroth | ................ H04L 67/12 370/338 |
| 2008/0235400 A1 | 9/2008 | Slocombe et al. | |
| 2015/0043570 A1 * | 2/2015 | Filsfils | ................ H04L 41/0813 370/351 |
| 2015/0103662 A1 | 4/2015 | Valero | |
| 2015/0381493 A1 | 12/2015 | Bansal | |
| 2016/0119219 A1 | 4/2016 | Fang | |
| 2016/0269911 A1 | 9/2016 | Cheng | |
| 2016/0277463 A1 * | 9/2016 | Nagarajan | ............... H04L 12/18 |
| 2016/0294677 A1 | 10/2016 | Kazerani | |
| 2016/0301593 A1 | 10/2016 | Blair | |
| 2016/0315692 A1 * | 10/2016 | Ahluwalia | ......... H04B 7/18584 |
| 2016/0380892 A1 | 12/2016 | Mahadevan | |
| 2017/0195220 A1 * | 7/2017 | Sivaraj | .................. H04L 61/103 |
| 2017/0279709 A1 * | 9/2017 | Bonica | ................. H04L 45/125 |
| 2017/0331724 A1 * | 11/2017 | Carney | ................. H04L 47/825 |
| 2017/0346691 A1 * | 11/2017 | Crickett | ............... H04L 41/0823 |
| 2017/0346722 A1 | 11/2017 | Smith et al. | |

OTHER PUBLICATIONS

International Search Report dated Jul. 21, 2017, Int'l Appl. No. PCT/US17/032699, Int'l Filing Date May 15, 2017; 3 pgs.
Written Opinion of the International Searching Authority dated Jul. 21, 2017, Int'l Appl. No. PCT/US17/032699, Int'l Filing Date May 15, 2017; 7 pgs.

* cited by examiner

| PERFORMANCE CHARACTERISTIC | CRITERIA | CORRECTION FACTOR (CF) |
|---|---|---|
| LATENCY | - - - | CF=CF+LV |
| JITTER | JITTER < 1.0% | CF=CF+1 |
| | 1.0% < JITTER < 5.0% | CF=CF+2 |
| | JITTER > 5.0% | CF=CF+3 |
| PACKET LOSS | PACKET LOSS < 0.5% | CF=CF+0 |
| | 0.5% < PACKET LOSS < 2.0% | CF=CF+3 |
| | PACKET LOSS > 2.0% | CF=CF+6 |

FIG. 2

ROUTE SELECTION SYSTEM FOR A COMMUNICATION NETWORK AND METHOD OF OPERATING THE SAME

RELATED APPLICATIONS

This application is a continuation of and claims priority to U.S. patent application Ser. No. 15/595,450, filed May 15, 2017, now U.S. Pat. No. 10,389,621, entitled "Route Selection System For a Communication Network and Method of Operating The Same," which claims the benefit of priority from U.S. Provisional Patent Application No. 62/340,955, filed May 24, 2016, the entire contents of each of which are incorporated herein by reference.

TECHNICAL FIELD

Aspects of the present disclosure relate to communication networks, and in particular, to a route selection system for a communication network and a method of operating the same.

BACKGROUND

Routing of packets in packet-based networks, such as the Internet, typically function according to a standardized protocol, such as a border gateway protocol (BGP). The BGP is generally used to exchange routing and reachability information between network elements (NEs) on the network that they serve. The BGP makes decisions based on paths, network policies and/or rules that may be configured automatically or manually by one or more network administrators. Additionally, the BGP protocol plays a key role in the overall operation of many packet-based communication networks and is involved in making core routing decisions.

SUMMARY

According to one embodiment of the present disclosure, a route selection system includes a hub controller in communication with multiple network hubs of a first network domain in which each of the hubs are in communication with a corresponding multiple routers of a second network domain. The hub controller is executed to obtain at least one performance measurement associated with a route terminating at the network hub, generate a border gateway protocol (BGP) advertisement with a preference value that is proportional to the received performance measurement, and transmit the generated advertisement to the network hub, the network hub forwarding the advertisement to the router configured in the other network domain. Upon receipt of the advertisements, the second network domain selects one of the routers for processing the route through the second network domain according to the performance measurement included in the advertisement.

BRIEF DESCRIPTION OF THE DRAWINGS

The foregoing and other objects, features and advantages of the disclosure will be apparent from the following description of particular embodiments of the disclosure, as illustrated in the accompanying drawings in which like reference characters refer to the same components throughout the different views. The drawings are not necessarily to scale, emphasis instead being placed upon illustrating the principles of the disclosure.

FIG. 2 illustrates an example lookup table that may be used by the hub controller to generate border gateway protocol (BGP) advertisement preference values that are proportional performance measurements obtained from the software defined wide area network (SD-WAN) hubs according to one embodiment of the present disclosure.

DETAILED DESCRIPTION

Embodiments of the present disclosure provide a communication network having a private network domain, such as a multiprotocol label switching (MPLS) based Internet protocol virtual private network (IP-VPN), and a software defined wide area network (SD-WAN) domain that may be overlaid on a public network, such as the Internet. The SD-WAN domain includes a SD-WAN controller that, for each of multiple SD-WAN hubs, generates border gateway protocol (BGP) advertisements having preference values, which are proportional to one or more performance measurements provided by the SD-WAN. SD-WAN hubs of the network then transmit these BGP advertisements to each of multiple provider edge (PE) routers configured in the private network domain so that the PE routers may select one from among the multiple SD-WAN hubs for handling a communication route between a host coupled to the SD-WAN and another host coupled to the private network.

In general, SD-WANs provide an approach to computer networking that allows for the overlay of a private network or enterprise onto a public network. This is done by creating secure or private tunnels through the public network that operate to carry the traffic and packets of a private network. Thus, with an SDN, network intelligence and its state are typically logically centralized while the underlying network infrastructure is abstracted from the routes through the SDN.

Whereas conventional private networks have been developed using technologies, such as MPLS, SD-WAN may provide cost savings due to the ability to use existing infrastructures, such as public networks (e.g., the Internet) rather than leased lines, which are often required due to reliability and availability requirements of users. Nevertheless, many MPLS based private networks still remain in service as their replacement is generally cost-prohibitive. In general, it is anticipated that private networks, such as MPLS networks will remain in service for years to come.

In many cases, it would be beneficial to integrate SD-WAN functionality with the older private networks. For example, while many new deployments are provided with SD-WANs, they still often require integration with older existing MPLS private networks. However, many autonomous features provided by SD-WANs are not easily compatible with private networks. For example, SD-WANs may provide dynamic path selection based on load sharing across multiple links to ensure certain availability and reliability requirements, but this dynamic path selection feature provided by SD-WAN protocol has not heretofore been compatible with path selection mechanisms provided by conventional private networks.

Figure 1:
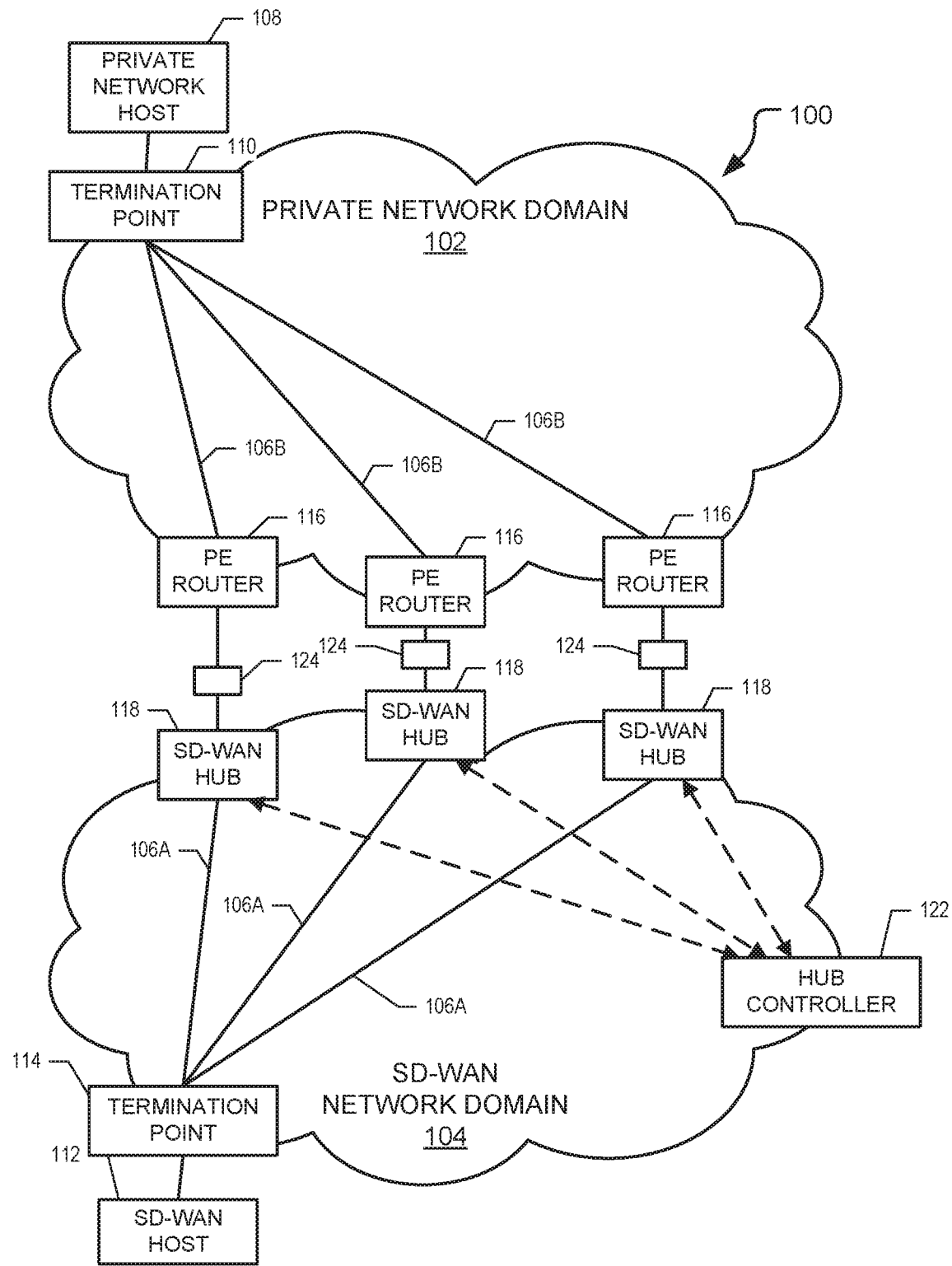
FIG. 1 illustrates an example route selection system that may be implemented on a communication network according to one embodiment of the present disclosure.

FIG. 1 illustrates an example route selection system 100 that may be implemented on a communication network according to one embodiment of the present disclosure. The route selection system 100 includes a private network domain 102, and a SD-WAN domain 104 that function together to provide at least one of multiple available communication routes 106 between a private network host 108 coupled to the private network domain 102 via a termination point 110, and a SD-WAN host 112 coupled to the SD-WAN domain 104 via termination point 114. It should be appreciated that any number of private network hosts 108 (and associated termination points 110) may be connected to the private network domain 102. Similarly, any number of SD-WAN hosts 112 (and associated termination points 114) may be connected to the SD-WAN domain 104. To facilitate communication between the domains, the private network domain 102 includes multiple provider edge (PE) routers 116 that are communicatively coupled to corresponding multiple SD-WAN hubs 118 in the SD-WAN domain 104 to relay the communication routes 106 between the private network domain 102 and the SD-WAN domain 104. As will be described in detail herein below, a hub controller 122 is provided in the SD-WAN domain 104 that controls each of the SD-WAN hubs 118 to obtain service level agreement measurements from the SD-WAN domain 104, and generate BGP advertisements 124 that may be used by the private network domain 102 to select one of the routes 106b through the private network domain 102 for completing a communication path between the private network host 108 and the SD-WAN host 112.

In general, the SD-WAN domain 104 functions according to a software defined wide area network (SD-WAN) protocol, and may be overlaid on a public network. One such public network is the Internet. Such a SD-WAN protocol provides for secure, private communications over public networks that may not provide the secure transmission paths through the network. Additionally, because the performance of the public network is generally not guaranteed due mainly to its publicly available nature, the user of the public network to support the SD-WAN may become problematic. However, in one embodiment of the present disclosure, the SD-WAN protocol may provide service level agreement measurements that allow the SD-WAN hubs 118 to alternatively select one from among multiple available routes 106a that may be used to convey communication packets between the SD-WAN host 112 and the private network host 108. For example, the SD-WAN hubs 118 may each receive one or more performance measurements associated with a route 106a originating at the SD-WAN host 112 and ending at the respective SD-WAN hub 118. Thus, each SD-WAN hub 118 receives performance information for a related path through the public network domain 104 such that the SD-WAN hub 118 having the best performance factors to convey the route 106a may be selected to transmit the packets through the network. The SD-WAN hubs 118, in general, may function as routers that route packets according to one or more communication protocols, such as a transfer control protocol (TCP) and/or an Internet protocol (IP).

The private network domain 102 may be any suitable private network. In one embodiment, the private network domain 102 operates according to a MPLS based IP-VPN protocol. Such a protocol is often used where the routers and the communication routes 106 through the private network domain 102 are managed by an administrator of the private network domain 102 so that the performance of routes 106b through the private network domain 102 may be controlled. The private network domain 102 and the SD-WAN network domain 104 may also use a border gateway protocol (BGP) signaling scheme in which nodes announce networking information to other components and certain routes 106b may be automatically selected according to one or more performance criteria.

Although the present example route selection system 100 is implemented on a network domain conforming to the SD-WAN protocol and a private network domain conforming to a BGP signaling protocol, it is contemplated that the SD-WAN network domain be implemented with any suitable signaling protocol where one or more performance characteristics may be provided for each route of a multi-path architecture.

One salient drawback that may be encountered when using the private network domain 102 to convey a route 106 between a private network host 108 coupled to the private network domain 102 and a SD-WAN host 112 coupled to the SD-WAN domain 104 is that the routers 116 often have little or no inherent knowledge of which routes through the SD-WAN domain 104 is congested or slow and which ones are not. Rather, the PE routers 116 of the private network domain 102 typically forward received traffic to the metrically closest SD-WAN hub 118 of the SD-WAN network 104. In other words, rather than selecting the best or optimal route through the SD-WAN 104, the private network domain 102 provides received traffic to the SD-WAN hub 118 nearest the PE router 116 that receives the packets. Embodiments of the present disclosure provide a solution to this problem by configuring gathering such performance information at a hub controller 122, configuring each of the SD-WAN hubs 118 to generate advertisements 124 of the received measurements provided by the SD-WAN controller 122, and transmitting these advertisements 124 to their corresponding private network routers 116 so that the private network domain 102 may select one of the network SD-WAN hubs having the greatest preference for forwarding communication traffic from the selected SD-WAN hub 118 to the private network host 108.

The advertisements 124 may be any suitable signaling type that allows the routers 116 of the private network domain 102 (or any other component of the private network) to select the SD-WAN hub 118 advertising the best performance factors for completing the route 106b. In one embodiment in which the routers 116 are provider edge (PE) routers that function according to the BGP protocol, the advertisements 124 may be community advertisements, local preference advertisements, or multi-exit discriminator (MED) advertisements. In a particular embodiment, the SD-WAN hubs 118 may generate MED advertisements due to their scalability (e.g., the SD-WAN hubs may require relatively little or no re-configuration as SD-WAN hubs 118 are added or removed from the SD-WAN), and may not require significant pre-configuration as may be required by community advertisements.

Each SD-WAN hub 118 may generate the BGP advertisements 124 at ongoing intervals so that the route 106 through the SD-WAN domain 104 may be re-directed as the performance of the routes 106 in the SD-WAN domain 104 changes over time. For example, the SD-WAN hubs 118 may re-broadcast the MED value at periodic intervals (e.g., every 1 to 5 minutes) to transmit advertisements 124 to their corresponding routers 116 so that the route 106b through the private network domain 102 may be re-selected due to changes in performance in the public network (e.g., the Internet) on which the SD-WAN domain 104 is overlaid. This periodic broadcast of performance metrics may occur without human interaction with the network components so that the routes through the networks may be adjusted in response to performance changes within the public network.

In one embodiment, the SD-WAN domain 104 may include a hub controller 122 that receives one or more performance characteristic (e.g., packet loss, jitter, latency, etc.) measurements from each of the SD-WAN hubs 118, generates a MED value for each SD-WAN hub 118 according to the received performance characteristics, and transmits the generated MED values to their respective SD-WAN hubs 118, which can then be forwarded by the SD-WAN hub 118 to its corresponding router 116 in a BGP or other type of signaling announcement. In another embodiment, the hub controller 122 may use the performance measurements to select a particular SD-WAN hub 118 to handle the route 106 and transmit instructions to that particular SD-WAN hub 118 to complete the route 106b between the SD-WAN domain 104 and the private network domain 102.

The SD-WAN hubs 118 and hub controller 122 may include at least one processor that executes instructions stored in at least one memory (e.g., computer readable media) for performing the various features of the SD-WAN hubs 118, and/or hub controller 122 described herein. In other embodiments, the SD-WAN hubs 118 and/or hub controller 122 may be embodied in other specific forms, such as discrete and/or integrated analog circuitry, field programmable gate arrays (FPGAs), application specific integrated circuitry (ASICs), or any combination thereof. Additionally, the SD-WAN hub controller 122 and SD-WAN hubs 118 may both share processing responsibilities for generating and transmitting the generated MED values to the routers 116.

Although FIG. 1 illustrates one example route selection system 100 that may be used for selecting routes 106 between networking components using performance measurements obtained from a SD-WAN network domain 104, it should be understood that the route selection system 100 may include additional, fewer, or different components than what are shown and described herein. For example, the private network domain 102 and SD-WAN network domain 104 may be communicatively coupled via any number of SD-WAN hub/router combinations, such as two SD-WAN hub/router combinations, or four or more hub/router combinations. Additionally, the hub controller 122 may be omitted if the SD-WAN hubs 118 are configured to function as autonomous systems (ASs) in which each SD-WAN hub 118 is responsible for obtaining the performance measurements, generating the BGP advertisement preference value, and transmitting BGP advertisements including the generated preference value to its respective router 116 without the involvement of the hub controller 122.

FIG. 2 illustrates an example lookup table 200 that may be used by the hub controller 122 to generate BGP advertisement preference values that are proportional performance measurements obtained for the SD-WAN hubs 118 according to one embodiment of the present disclosure. In general, the lookup table 200 provides a repository for storing criteria (e.g., threshold values, etc.) that may be associated with corresponding correction factors (CFs) to be applied to a base preference value. That is, the system 100 may obtain a base preference value (e.g., '100') and add or subtract from the base preference value according to one or more criteria applied to the obtained performance measurements.

The threshold values in the lookup table 200 may be modified autonomously by the hub controller 122 according to prevailing conditions in the SD-WAN network domain 104, and/or may be manually modified via user input from a user interface 308 (see FIG. 3 described below) configured on the hub controller 122. For example, the hub controller 122 may modify the criteria values and/or the correction factors associated with the criteria values according to changes in the SD-WAN network domain 104, such as bandwidth capacity of the SD-WAN network domain, certain time periods (e.g., morning, working hours, evening hours, nighttime hours, etc.) of the day, congestion in the SD-WAN network domain, and the like.

The lookup table 200 includes multiple rows in which each row represents a particular criterion associated with a performance characteristic that may be applied to a preference value correction factor (CF) such that the resulting correction factor is proportional to the performance measurement. For example, a base CF value may be assigned with a specified number, such as '100'. When the obtained performance measurements are received, they may be either added to, or subtracted from the base CF value to obtain a resulting CF value that is proportional to the obtained performance measurement. Thus, a SD-WAN hub 118 experiencing better performance measurements will have a lower (e.g., more preferential) preference value than other SD-WAN hubs 118 with worse performance measurements.

For example, as shown in FIG. 2, the lookup table 200 may specify that an obtained latency value (LV) is added to an existing CF to derive a modified CF in which the resulting CF value is proportional to the LV performance measurement. As another example, the lookup table 200 may specify that when an obtained jitter value (e.g., delayed variation in the receipt of packets) is less than 1.0 percent, then a value of '1' may be added to the existing CF value, when an obtained jitter value is greater than 1.0 percent but less than 5.0 percent, then a value of '2' may be added to the existing CF value, and when an obtained jitter value is greater than 5.0 percent, then a value of '3' may be added to the CF value. Thus, the SD-WAN hub 118 may assign increasing values to the CF value as the jitter increases and reduce the CF value as the jitter decreases.

As yet another example, the lookup table 200 may specify that when an obtained packet loss value (e.g., a fractional rate at which packets are lost in transit) is less than 0.5 percent, then a value of '0' may be added to the existing CF value, when an obtained jitter value is greater than 0.5 percent but less than 2.0 percent, then a value of '3' may be added to the existing CF value, and when an obtained jitter value is greater than 2.0 percent, then a value of '6' may be added to the CF value. Thus, the SD-WAN hub 118 may assign increasing values to the CF value as the packet loss increases.

Thus, the resulting CF may include one or a combination of performance measurements associated with the routes 106a through the SD-WAN domain 104. In a particular embodiment in which the controller 122 generates MED BGP advertisements, the resulting CF value may be included as the preference value in the MED BGP advertisement that is sent to its respective SD-WAN hub 118.

In one embodiment, the performance characteristics and their associated values may be associated with a service level agreement (SLA) established between a communication service provider (CSP) of the SD-WAN network domain 104 and/or the private network domain 102 and a customer that uses the routes 106. In general, a contractual agreement between the CSP and the customer of the communication network specifies what services are to be provided and any performance levels associated with these services. For example, the CSP may offer multiple service plans that each provides differing combinations and levels of communication services, such as voice communication services, video communication services, and/or data communication services, such as short messaging services (SMS), multimedia messaging services (MMS), and the like. Additionally, the service plans offered by the CSP may specify varying performance levels associated with each communication service, such as quality of service (QoS) levels, grade of service (GoS) levels, and/or terms of service (ToS) levels. For example, the service level agreement may include information about a minimum and/or guaranteed level of throughput to be maintained by the communication path, and a maximum level of burstiness to be exhibited by the communication path. Thus, the performance characteristics and their associated value may be tailored for each customer to ensure that the agreed upon service level agreement is met.

Although the lookup table 200 shows performance characteristics including a latency performance characteristic, a jitter performance characteristic, and a packet loss performance characteristic, it is contemplated that the lookup table 200 may include any number and type of performance characteristics. For example, the lookup table 200 may include separate criteria for one-way latency and two-way latency. Also, the performance measurements (e.g., latency, jitter, and/or packet loss, etc.) may be combined in any suitable manner to provide a composite metric that is provided as an advertisement to the routers 116. That is, it is contemplated that the modifications to the CF may be performed by using scalar fractional values that are multiplied by a base preference value.

Figure 3:
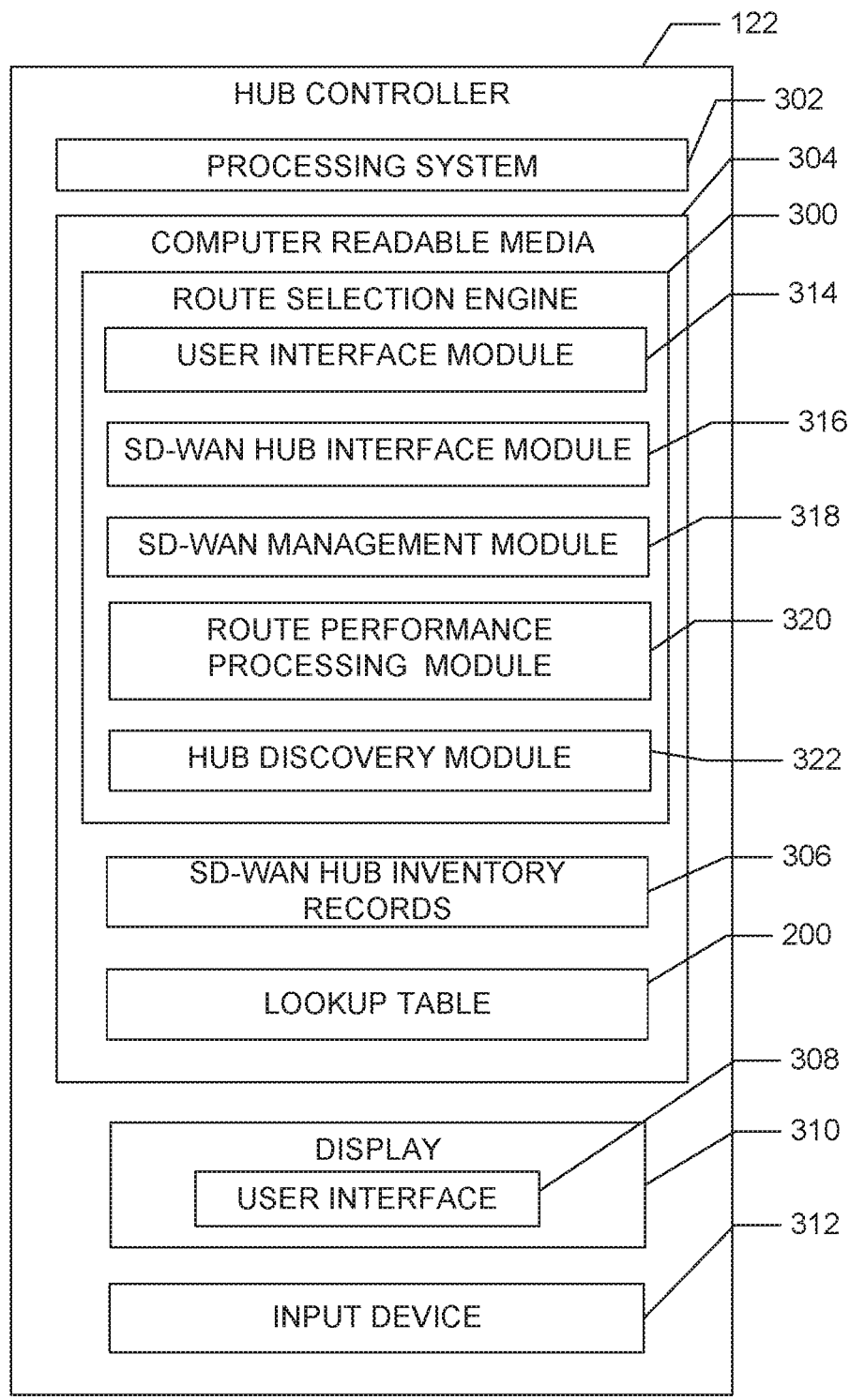
FIG. 3 is a block diagram depicting an example hub controller engine executed on the hub controller according to one embodiment of the present disclosure.

FIG. 3 is a block diagram depicting an example hub controller engine 300 executed on the hub controller 122 according to one embodiment of the present disclosure. The hub controller 122 includes a processing system 302 that includes one or more processors or other processing devices. A processor is hardware. Examples of such a computing system include one or more servers, personal computers, mobile computers and/or other mobile devices, and other computing devices. The hub controller 122 may communicate with the NEs via wireless, wired, and/or optical communications.

According to one aspect, the hub controller 122 includes a tangible and non-transient computer readable media 304 on which the engine 300, in the form of computer executable instructions, and data source 106 are stored. The engine 300 includes instructions or modules that are executable by the processing system 302 to perform the features of the data hub controller engine system 100 described herein. The computer readable media 304 is tangible and may include volatile media, nonvolatile media, removable media, non-removable media, and/or another available media that can be accessed by the Route selection engine computing system 118.

The computer readable media 304 may also store the lookup table 200 and one or more hub inventory records 306 that include various forms of information about the SD-WAN hubs 118 in the SD-WAN network domain 104. For example, the hub inventor records 306 may include information associated with all active SD-WAN hubs 118 in the SD-WAN network domain 104 that may be available for handling routes through the SD-WAN network domain 104. Additionally, the hub inventory records 306 may store performance measurements for each active route currently terminated at its respective SD-WAN hub 118. By storing the performance measurements, the engine 300 may obtain the performance measurements at ongoing (e.g., periodic) intervals, and generate the preference values for BGP advertisements at an on-demand basis when these values are requested.

According to one aspect, the computing system 102 may include a user interface 308 displayed on a display 310, such as a computer monitor, for displaying data. The controller 122 may also include an input device 312, such as a keyboard or a pointing device (e.g., a mouse, trackball, pen, or touch screen) to enter data into or interact with the user interface 308. According to one aspect, the engine 300 includes instructions or modules that are executable by the processing system 302 as will be described in detail herein below.

A user interface module 314 facilitates the receipt of input data and/or output data from or to a user, respectively, for manipulating the operation of the system 100. In one example, the user interface module 314 may receive user input for manipulating or otherwise modifying the threshold values and/or correction factors to each measured characteristic. As another example, the user interface module 314 may display information associated with the SD-WAN hubs 118, routes 106, and/or performance measurements for each route 106.

A SD-WAN hub interface module 316 communicates with each of the SD-WAN hubs 118 and obtains performance measurements for each route 106 through the SD-WAN network domain 104. For example, the SD-WAN hub 118 may include one or more measurement devices (e.g., a network packet sniffer, etc.) or one or more algorithms (e.g., a task manager, a network diagnosis algorithm, etc.) executed on its respective hub 118 that measures or otherwise obtains the performance measurements for each route 106, and communicates with the SD-WAN hub interface module 314 to transfer these performance measurements to the engine 300.

A SD-WAN controller module 318 controls each SD-WAN hub 118 to implement the SD-WAN protocol in the SD-WAN network domain 104. For example, the SD-WAN controller module 318 may control each SD-WAN hub 118 to perform one or more multi-path management tasks, such as load balancing between the hubs, route failover, as well as to perform load balancing for the routes such that an overall path provided by the multiple routes conform to one or more performance goals (e.g., SLAs). In one embodiment, the SD-WAN controller module 318 may obtain the performance measurements for each SD-WAN hub 118 that may be used by the engine 300 for generating the BGP advertisement.

A route performance processing module 320 obtains the performance measurements and generates a BGP advertisement with a preference that is proportional to the obtained performance measurements. The route performance processing module 320 may generate the BGP advertisement preference from a single performance measurement or it may combine the performance measurements of multiple characteristics to derive an overall preference to be included in the BGP advertisement. In one embodiment, the route performance processing module 320 may combine multiple performance measurements by using a correction factor that is added or subtracted from a base scalar value. In another embodiment, the route performance processing module 320 may combine multiple performance measurements by using scalar fractional values that are multiplied by the base scalar value. When the preference value is calculated by the route performance processing module 320, it may then generate and transmit a BGP advertisement including the calculated preference value to each SD-WAN hub 118 in which each SD-WAN hub 118 then transmits the BGP advertisement to its respective router in the private network domain 102.

A hub discovery module 322 continually monitors the SD-WAN network domain 104 to identify newly configured SD-WAN hubs 118 in the SD-WAN network domain 104 and identify those existing SD-WAN hubs 118 that may been removed (e.g., taken out of service, physically removed, etc.) to maintain an up-to-date list of active SD-WAN hubs 118 in the SD-WAN network domain 104 in the hub inventory records 306. For example, the hub discovery module 322 may periodically poll (e.g., every 1 to 5 minutes) the SD-WAN management module 318 to obtain a list of all SD-WAN hubs 118 in the SD-WAN network domain 104 that are currently functional, and once this list is obtained, generate a record 306 for each SD-WAN hub 118 that may include information about that SD-WAN hub 118, such as historical performance measurements, current performance measurements, and the like that may be used to generate the BGP advertisements.

It should be appreciated that the modules described herein are provided only as an example of a computing device that may execute the route monitoring service 120 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as one or more of the hubs 118 in the SD-WAN network domain 104.

Figure 4:
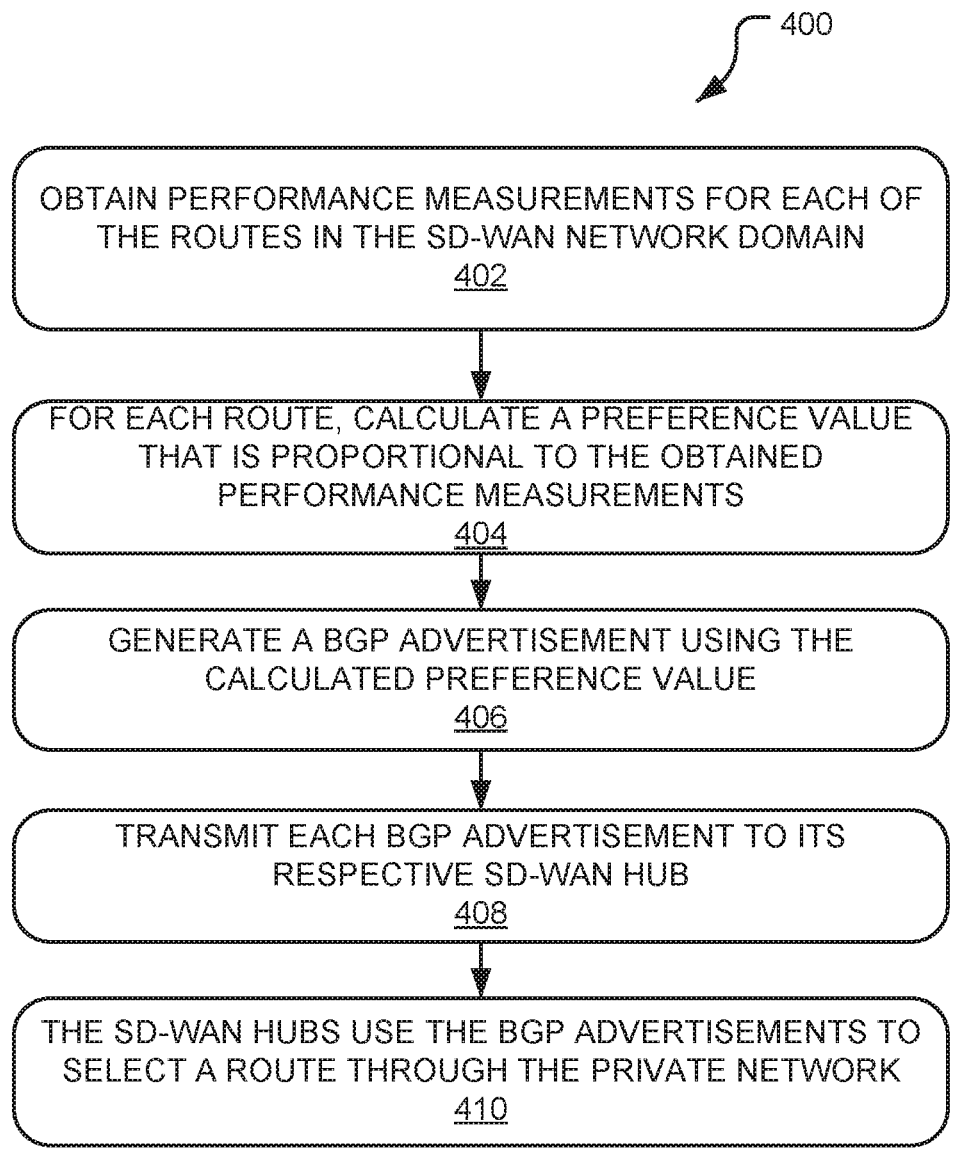
FIG. 4 illustrates an example process that may be performed by the hub controller engine according to one embodiment of the present disclosure.

FIG. 4 illustrates an example process that may be performed by the hub controller engine 300 according to the teachings of the present disclosure. Initially, the SD-WAN hubs 118 are deployed in the SD-WAN network domain 104, routers 116 are deployed in the private network 102, the SD-WAN hubs 118 are communicatively coupled to corresponding SD-WAN hubs 118, and multiple routes 106 are established through each of the private network domain 102 and the SD-WAN network domain 104.

At step 402, the engine 300 obtains performance measurements for each of the routes 106 in the SD-WAN network domain 104. The engine 300 may obtain the performance measurements in any suitable manner. In one embodiment, the engine 300 may periodically poll (e.g., every 1 to 5 minutes) each SD-WAN hub 118 to obtain the performance measurements, or the SD-WAN hubs 118 may be configured to autonomously transmit the performance measurements at regular intervals to the engine 300 such that the engine 300 stores the obtained performance measurements in the SD-WAN hub inventory records 306.

At step 404, the engine 300 calculates a preference value that is proportional to the obtained performance measurements for each of the routes. In one embodiment, the engine 300 may calculate the preference value using a base correction factor that is modified according to one or more criteria associated with a type of the performance characteristic that the performance measurement is based on. For example, the engine 300 may modify a base correction factor value according to how good, or how bad, the received performance measurement for each SD-WAN hub 118 is. Using the base correction factor, the performance measurements from multiple performance characteristics may be combined to form a single resulting correction factor that may be included as a preference value in the BGP advertisement at step 406.

At step 408, the engine 300 transmits each BGP advertisement to the SD-WAN hub 118 from which the performance measurements were received. Thereafter, each SD-WAN hub 118 forwards the BGP advertisement to its associated router 116 in the private network domain 102 so that the routers 116 functioning according to the BGP protocol, may select the route having the best performance characteristics. Thereafter, at step 410, the routers 116 use the BGP advertisements 124 to select a route through the private network 102.

The process may be repeated to continually select routes throughout the use of the hub controller engine 300. Nevertheless, when use of the hub controller engine 300 is no longer needed or desired, the process ends.

It should be appreciated that the process described herein is provided only as an example and that the hub controller engine 400 may execute additional steps, fewer steps, or differing steps than those described herein. For example, the steps 402 through 410 may be executed in any suitable order; that is, the steps as described in FIG. 4 are not limited to execution in any particular sequence. As another example, either of the steps 402 through 410 described herein may be executed by one of the hubs or may alternatively be performed by another computing system without departing from the spirit or scope of the present disclosure.

Figure 5:
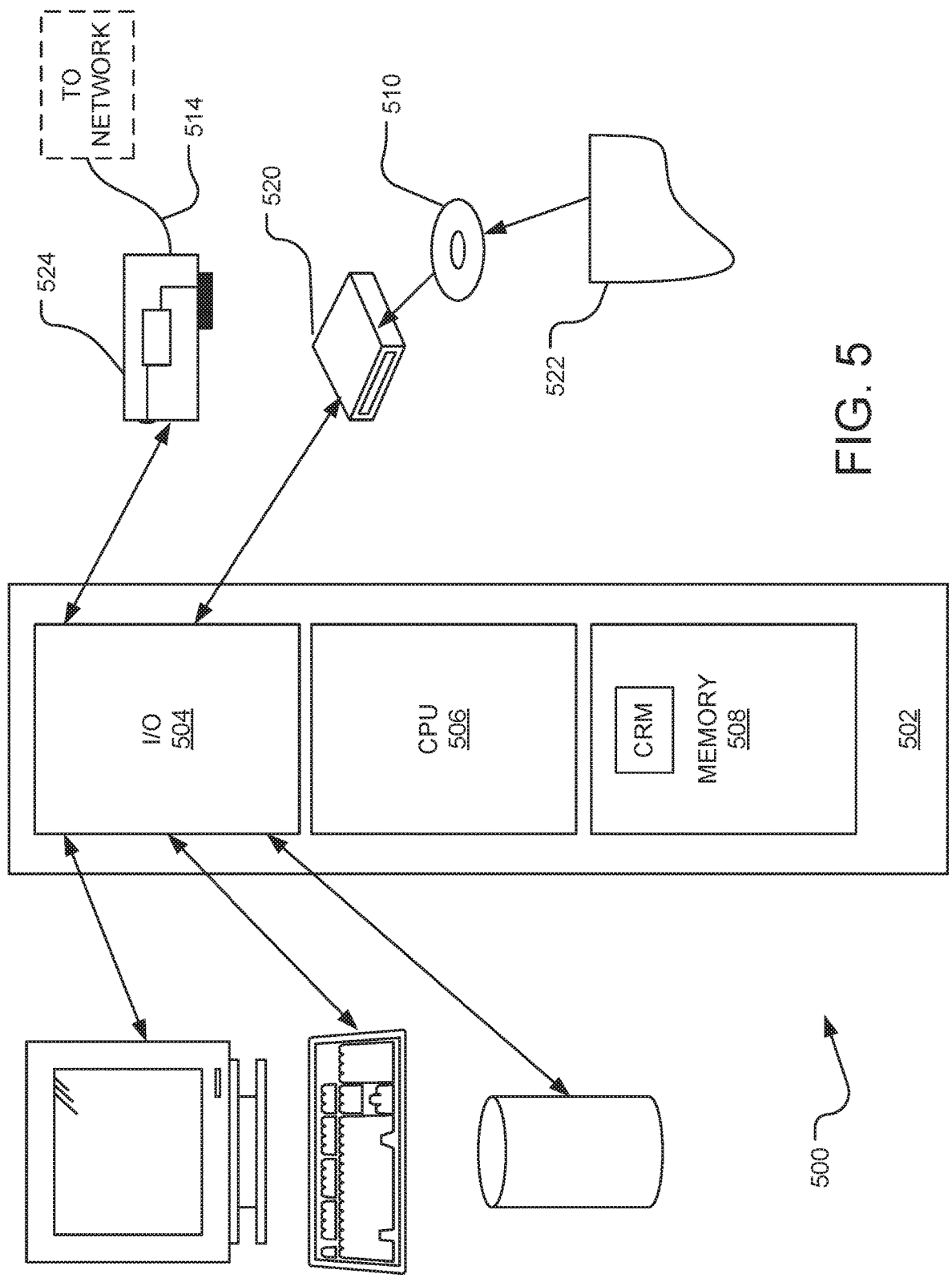
FIG. 5 illustrates an example computing system that may implement various systems and embodiments discussed herein.

FIG. 5 illustrates an example computing system 500 that may implement various systems discussed herein. A general purpose computer system 500 is capable of executing a computer program product to execute a computer process. Data and program files may be input to the computer system 500, which reads the files and executes the programs therein such as an application that executes the features described above. Some of the elements of a general purpose computer system 500 are shown in FIG. 5 wherein a processing system 502 is shown having an input/output (I/O) section 504, a hardware central processing unit (CPU) 506, and a memory section 508. The processing system 502 of the computer system 500 may have a single hardware central-processing unit 506 or a plurality of hardware processing units. The computer system 500 may be a conventional computer, a server, a distributed computer, or any other type of computing device, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, nonvolatile media, removable media, non-removable media, and/or other hardware media or hardware mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 504 is connected to one or more optional user-interface devices (e.g., a user interface such as a keyboard 516 or the user interface 512), an optional disc storage unit 512, an optional display 518, and an optional disc drive unit 520. Generally, the disc drive unit 520 is a DVD/CD-ROM drive unit capable of reading the DVD/CD-ROM medium 510, which typically contains programs and data 222. Computer program products containing mechanisms to effectuate the systems and methods in accordance with the presently described technology may reside in the memory section 508, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by a tape drive unit, or other storage medium drive unit. An optional network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 512 or the DVD/CD-ROM medium 510, and/or other external storage devices made available and accessible via a network architecture. The source code executed by the control circuit 118 may be embodied by instructions stored on such storage systems and executed by the processing system 502.

Some or all of the operations described herein may be performed by the processing system 502, which is hardware. Further, local computing systems, remote data sources and/or services, and other associated logic represent firmware, hardware, and/or software configured to control operations the system 100 and/or other components. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A network hub in a system, the system comprising a plurality of network hubs of a first network domain, each of the network hubs in communication with a corresponding plurality of routers of a second network domain, the network hub comprising at least one memory for storing instructions that are executed by at least one processor to:
   obtain a performance measurement associated with a route terminating at a router of the plurality of routers;

generate a border gateway protocol (BGP) advertisement with a preference value that is proportional to the obtained performance measurement; and transmit the BGP advertisement to the router, the router configured to forward the BGP advertisement to a termination point in the second network domain, wherein the instructions are further executed to select one of the plurality of routers for processing a communication through the second network domain according to the performance measurement included in the BGP advertisement, obtain a new performance measurement at ongoing intervals, generate a new BGP advertisement after a new performance measurement is obtained, and transmit the new BGP advertisement to the router.

2. The network hub of claim 1, wherein the instructions are further executed to receive a second BGP advertisement and forward the second BGP advertisement to one of the plurality of routers according to a performance measurement included in the second BGP advertisement.

3. The network hub of claim 1, wherein generating BGP advertisements comprises re-broadcasting MED (Multi-exit discriminator) values at the ongoing intervals.

4. The network hub of claim 1, wherein the plurality of routers comprise provider edge (PE) routers and the second network domain comprises a multiprotocol label switching (MPLS) based Internet protocol virtual private network (IP-VPN).

5. The network hub of claim 1, wherein the obtained performance measurement comprises a plurality of performance measurements of a service level agreement, the route terminating at the termination point provided according to the service level agreement.

6. The network hub of claim 5, wherein the service level agreement measurement comprises at least one of a latency performance value, a jitter performance value, or a packet loss performance value of the route.

7. The network hub of claim 5, wherein the instructions are further executed to combine the plurality of performance measurements using a correction factor that is modified according to the value of the performance measurements.

8. The network hub of claim 7, wherein the instructions are further executed to modify the correction factor by comparing the values of the performance measurements to a lookup table and modifying the correction factor based on the comparison between the values of the performance measurements and the lookup table.

9. A method comprising:

obtaining, using at least one processor executing instructions stored in at least one non-transitory memory, at least one performance measurement associated with a route terminating at a router for each of a plurality of routers of a second network domain, the plurality of routers in communication with a termination point in the second network domain;

generating, using the instructions, a border gateway protocol (BGP) advertisement with a preference value that is proportional to the obtained performance measurement; and transmitting, using the instructions, the BGP advertisement to the router, the router configured to forward the BGP advertisement to a termination point in the second network domain, wherein the at least one processor executes instructions to select one of the plurality of routers for processing a communication through the second network domain according to the performance measurement included in the BGP advertisement, obtain a new performance measurement at ongoing intervals, generate a new BGP advertisement after a new performance measurement is obtained, and transmit the new BGP advertisement to the router.

10. The method of claim 9, wherein the instructions are further executed to receive a second BGP advertisement and forward the second BGP advertisement to one of the plurality of routers according to a performance measurement included in the second BGP advertisement.

11. The method of claim 9, wherein generating BGP advertisements comprises re-broadcasting MED (Multi-exit discriminator) values at the ongoing intervals.

12. The method of claim 9, wherein the plurality of routers comprise provider edge (PE) routers and the second network domain comprises a multiprotocol label switching (MPLS) based Internet protocol virtual private network (IP-VPN).

13. The method of claim 9, wherein the obtained performance measurement comprises a plurality of performance measurements of a service level agreement, the route terminating at the termination point provided according to the service level agreement.

14. The method of claim 13, wherein the service level agreement measurement comprises at least one of a latency performance value, a jitter performance value, or a packet loss performance value of the route.

15. The method of claim 13, wherein the instructions are further executed to combine the plurality of performance measurements using a correction factor that is modified according to the value of the performance measurements.

16. The method of claim 15, wherein the instructions are further executed to modify the correction factor by comparing the values of the performance measurements to a lookup table and modifying the correction factor based on the comparison between the values of the performance measurements and the lookup table.

17. A telecommunications network comprising a plurality of network hubs providing a route through the telecommunications network, each of the plurality of network hubs in communication with a corresponding plurality of routers in a second network domain, wherein a network hub of the plurality of network hubs comprises at least one processor and a non-transitory, computer-readable medium for storing instructions that are executed by the at least one processor, the instructions causing the at least one processor to perform operations comprising:

obtain a performance measurement associated with a route terminating at a router of the plurality of routers;

generate a border gateway protocol (BGP) advertisement with a preference value that is proportional to the obtained performance measurement; and transmit the BGP advertisement to the router, the router configured to forward the BGP advertisement to a termination point in the second network domain, wherein the instructions are further executed to select one of the plurality of routers for processing a communication through the second network domain according to the performance measurement included in the BGP advertisement, obtain a new performance measurement at ongoing intervals, generate a new BGP advertisement after a new performance measurement is obtained, and transmit the new BGP advertisement to the router.

18. The telecommunications network of claim 17, wherein the instructions further cause the at least one processor to receive a second BGP advertisement and forward the second BGP advertisement to one of the plurality of routers according to a performance measurement included in the second BGP advertisement.

\* \* \* \* \*